United States Patent Office 2,772,786
Patented Dec. 4, 1956

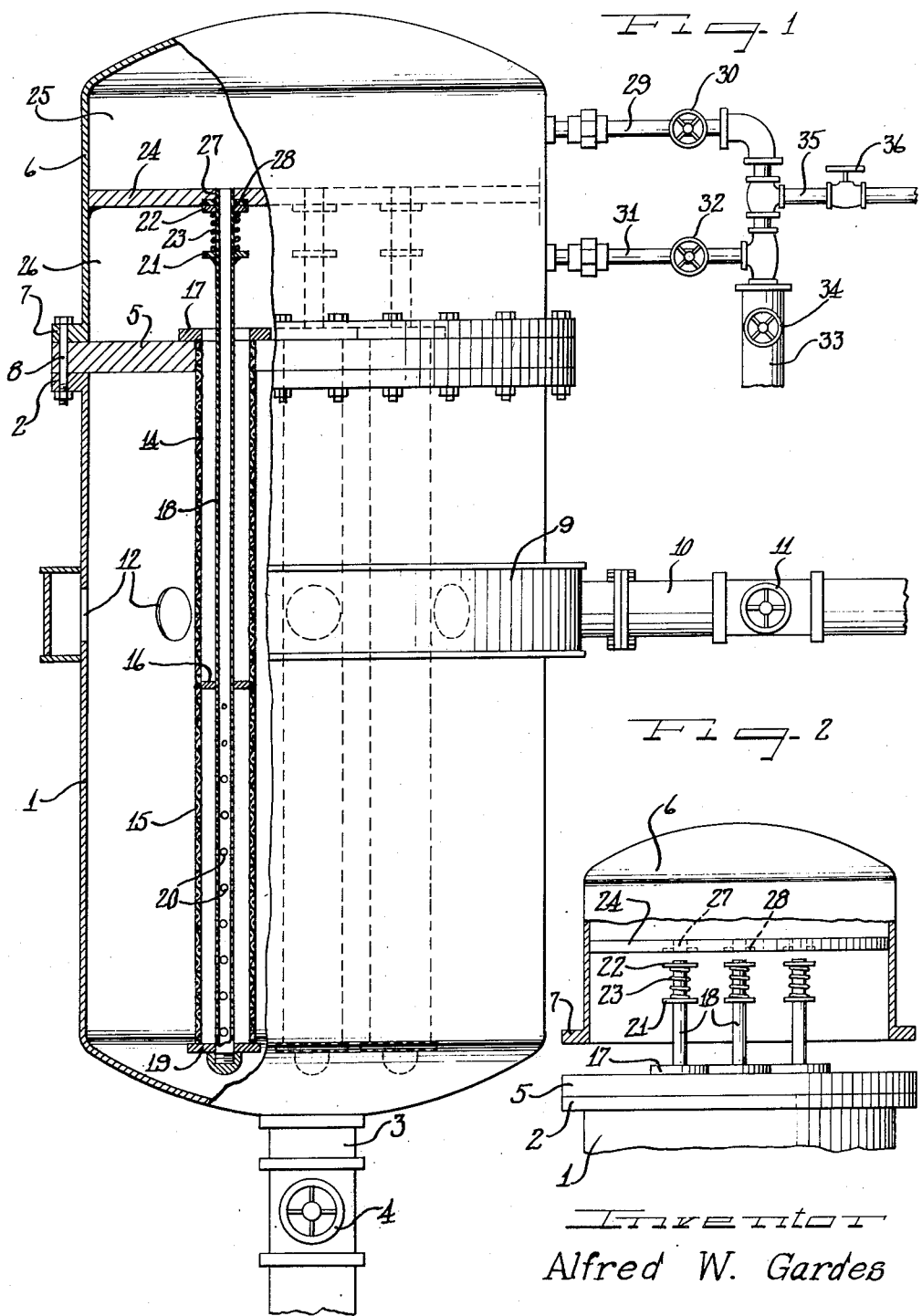

2,772,786
OUTLET ARRANGEMENT FOR BLOW-DOWN CLARIFIER

Alfred W. Gardes, Lebanon, Ind., assignor to Indiana Commercial Filters Corporation, a corporation of Indiana Application February 16, 1953, Serial No. 337,068

4 Claims. (Cl. 210—182)

This invention relates to improvements in an outlet arrangement for a blow-down clarifier of the type highly desirable for use in a cyclic system of fluid distribution, the outlet arrangement comprising the instant invention enabling the clarifier to function more efficiently than has heretofore been the case, although the invention may have other uses and purposes as will be apparent to one skilled in the art.

By way of specific example, clarifiers of the type with which the instant invention is herein shown incorporated are highly desirable for use in connection with the clarification of coolants of the character used in grinding and cutting machines, the clarifier forming a component part of the coolant circulating system. A clarifier of this general type embodies a casing having a plurality of filter or screen units therein through which contaminated coolant must flow and then the filtrate passes into a chamber from which it is pumped out to be recirculated to the mechanism requiring the coolant. Periodically, the outlet and inlet valves are closed, and compressed air is introduced into the filtrate chamber, forcing the contents of that chamber backward through the filter means in order to cleanse the same, this operation being commonly referred to as "blow-down."

In connection with large installations, wherein a single clarifier may cleanse all effluent for a battery of machines, it has sometimes been found advisable to utilize a double filter or screen unit arrangement to effect more positive cleansing upon blow-down or blowback, such double screens being more fully disclosed and described in my copending application for patent entitled Filtering Screen Assembly, filed December 23, 1950, Serial No. 202,537.

In the past, however, whether or not a clarifier included such a double screen arrangement or not, if the work load of the clarifier was cut down a considerable extent, the entire clarifier had to continue functioning, and if anything needed servicing on the clarifier, the entire clarifier had to be shut down until that servicing was effected. For example, if one of the filter or screen units became damaged so as to adversely affect the filtering efficiency, the clarifier could not continue in operation without the risk of contaminants being returned to the machines with the filtrate.

With the foregoing in mind, it is an important object of the instant invention to provide an outlet arrangement associated with such a clarifier, whereby whenever desired, the clarifier may operate at less than full capacity.

Also an object of this invention is the provision of a clarifier equipped with an outlet arrangement whereby if the load materially lessens, or a portion of the filtering means needs servicing or attention, the clarifier may remain in operation at a lowered capacity.

It is also a feature of this invention to provide a clarifier of the blow-down or blowback type, wherein the clarifier may be maintained in operation with substantially half the filtering means operating.

It is also a feature of the invention to provide a clarifier of the blow-down or blowback type wherein separate filtrate chambers are provided for substantially each half portion of the filter means, and both chambers may operate in unison with the clarifier running at full capacity, and both half portions of the filter means may be operated in unison with the clarifier functioning at full capacity, or either half portion of the filter means may selectively be put into operation, with the other half portion not functioning.

Still another object of this invention is the provision of a blow-down or blowback type of clarifier wherein one part of the filter means discharges filtrate into one filtrate chamber, while the other part of the filter means discharges into a separate filtrate chamber, the clarifier being equipped with means to simultaneously provide blowback pressure into both chambers, or selectively provide blowback pressure into either chamber.

Still a further feature of the invention resides in the provision of a clarifier of the blow-down or blowback type, wherein separate portions of the filtering or clarifying means may be individually operated with the remainder remaining idle, and such separate portions may also be cleansed by a blowback or blow-down operation to the exclusion of or conjointly with another portion.

A further object of the invention resides in the provision of a clarifier of the blow-down or blowback type, incorporating a relatively high head divided by a fixed partition into two separate filtrate chambers, the head being removable and replaceable with automatic disengagement and engagement with fluid lines from the filtering means which discharge through the partition during operation.

It is still a further feature of the invention to provide a clarifier incorporating fluid lines from filter means which automatically establish sealing engagement with a plate-like partition when that plate-like partition is disposed in operating position.

While some of the more salient features, characteristics and advantages of the instant invention have been above pointed out, others will become apparent from the following disclosures, taken in conjunction with the accompanying drawing, in which—

Figure 1 is a fragmentary part elevational, part vertical sectional view of a clarifying apparatus embodying principles of the instant invention; and Figure 2 is a reduced fragmentary, part elevational, part sectional view illustrating the inside structure upon removal of the clarifier head.

As shown on the drawings:

In the illustrated embodiment of the instant invention there is shown a clarifier comprising a casing 1 having an external flange 2 on the upper open end thereof, and a bottom closed with the exception of a downwardly leading discharge pipe 3, valved as indicated at 4. Seated upon the flange 2 is a filter or screen holding plate which may be sealed in any suitable manner. Resting upon the plate 5 is a relatively high head 6 of substantially inverted cup shape, flanged at its lower open end as indicated at 7, complementally to the flange 2 on the casing 1. In order to secure the parts together, a circle of bolts 8 extend through the flanges 2 and 7 and the outer margin of the plate 5.

Contaminated coolant or other liquid to be filtered is admitted to the tank by way of a circumscribing manifold 9 from an inlet pipe 10, valved as indicated at 11. Inside the manifold, the tank wall is provided with a plurality of apertures 12 so that the contaminated liquid enters the tank in a rather even distribution therearound, and preferably substantially centrally thereof.

The clarifying means per se are located inside the casing 1, suspended from the plate 5. There may be any desired number of clarifying or filtering units, depending upon the size and desired capacity of the clarifier. In the illustrated instance, and as more fully explained in my aforesaid application, each of the units includes an elongated tubular element comprising an upper screen 14, and a lower screen 15, these screens being separated by an imperforate partition 16 against which adjacent ends of the screens 14 and 15 abut. The entire filter unit is suspended from an apertured collar 17 secured to the upper end thereof and resting on the upper face of the plate 5, the plate being apertured for each filter unit to project downwardly therethrough. A pipe or delivery tube 18 extends entirely through the filter unit and is secured as by welding to the partition 16, the lower end of the pipe being threadedly associated with a cap 19 at the lower end of the filter unit. That portion of the pipe passing through the upper filter screen 14 is imperforate, while below the partition 16, the pipe is perforated as indicated at 20 to admit filtrate.

The pipe 18 is longer than the respective filter unit, and the upper end thereof extends above the collar 17. The upper portion of the pipe is provided with a flange 21 welded thereto, and a flange 22 floats on the pipe above the flange 21, there being a coil spring 23 circumscribing the pipe between the flanges, and the ends of the spring are secured to both flanges.

In the head 6, there is a transverse partition 24 fixed in position. This partition divides the interior of the head into two separate filtrate compartments 25 and 26. The partition 24 is provided with an aperture 27 for each pipe 18, and on the underside of the partition, there is a recess around each aperture to hold a sealing gasket 28. With reference to Fig. 1, it will be seen that when parts are assembled, the end of a pipe 18 extends through the respective aperture 27, the upper flange 23 abuts the sealing gasket 28 to provide a liquid tight seal around the pipe, and the spring 23 is somewhat compressed to insure such sealing engagement. With reference to Fig. 2, it will be seen that when the head 6 is removed, the plate 24 travels along with the head, and is lifted off the pipe ends 18, thus permitting the upper flange 22 to move to a position adjacent the free end of the respective pipe, but not reach that end, movement of this flange 22 being limited by the spring 23 attached thereto.

With the parts assembled in operating position, the contaminated liquid in the casing 1 passes through the filtering units, leaving the contaminants on the outside of the filter screens. The liquid passing through each upper screen 14 exits through the opening in the collar 17 into the filtrate chamber 26, while the liquid passing through each lower filter screen 15 enters the openings 20 in the pipe 18, passes upwardly through the pipe, and exists into the upper filtrate chamber 25. Filtrate exits from the upper chamber 25 through a pipe 29, valved as indicated at 30; and filtrate leaves the lower chamber 26 through a pipe 31, valved as indicated at 32. These pipes join with a main filtrate outlet pipe 33, valved as at 34.

Peroidically the filter units are cleansed by way of a blow-down or blowback operation. This may satisfactorily be effected with the use of compressed air from any suitable source. To this end, a fluid pressure pipe 35 is connected to the junction between the outlet pipes 29 and 31, and above the junction of these outlet pipes with the main filtrate distributing pipe 33. This fluid pressure pipe 35 is valved as indicated at 36.

Assuming now that the entire clarifying means of the device are in operation, and the filter units have become plugged to an objectionable extent, or it is time for a blow-down operation, the valve 11 in the intake pipe 10 is closed, the valve 4 in the blow-down discharge pipe 3 is opened, the valve 34 in the filtrate distribution pipe 33 is closed, the fluid pressure line valve 36 is opened, and the valves 30 and 32 remain open. Thus, compressed air or other fluid under pressure travels reversely through the pipes 29 and 31 into the filtrate chambers 25 and 26, and descends from the chamber 25 through the pipes 18, and from the chamber 26 through the openings in the collars 17. Pressure fluid carries all the filtrate in the chambers 25 and 26 ahead of it backwardly through the clarifying apparatus, thus washing the contaminants from the filter units, and forcing the contaminants down through the blow-down pipe 3 at the bottom of the casing 1. The closing and opening of the respective valves during a blow-down operation may be effected automatically by any suitable apparatus, and this operation need last but a few seconds. The frequency of blow-down operations is of course dependent upon the character of the contaminants. After a blow-down operation, the valves 4 and 36 are closed, and the valves 11 and 34 reopened, and the clarification may proceed as before.

It will be especially noted, however, that should the working load on the clarifier be cut down materially for any reason, such as the shutting down of a goodly portion of the machines in a bank, only a part of the filtering mechanism in the clarifier need be utilized. For example, if the valve 30 is closed, only the upper filter screen 14 of each unit is in operation, while if the valve 32 is closed and the valve 30 remains open, only the lower filter screen 15 of each unit is in operation. The closing of either valve 30 or 32 does not affect the blow-down operation at all, because the blow-down will be effective as to that portion of each filter unit in operation. This selectivity of only a portion of the filter mechanism to be in operation at any desired time, is extremely valuable, also, in the case of injury to a portion of filter unit to such extent that that portion passes contaminants. Such defect obviously, in nearly every instance, will occur in an upper or lower portion of the filter unit. Heretofore, it would have been necessary to shut down the entire clarifier immediately and effect repairs, whether or not repair men were then available. However, with the instant invention, it is a simple expedient to shut off a part of the clarifier in which the defective portion of the unit is located, and operation can at least be continued at partial capacity until it is deemed feasible to effect the needed repairs.

When repairs are being made, it is a simple expedient to disconnect the pipes 29 and 31, remove the bolts 8, lift off the head 6, and the elevation of the plate 5 carries with it all the filter units from inside the casing or tank 1.

From the foregoing, it is apparent that I have provided a highly simplified clarifier arrangement equipped with outlet means whereby any of a plurality of selected portions of the clarifying mechanism may be put into operation when desired to the exclusion of any other portion, or the entire mechanism may be operated in unison, the structure being simple, economical to build and operate, and highly durable.

It will be understood that modifications and variations may be effected without departing from the scope of the novel concepts of the present invention.

I claim as my invention:

1. In a liquid clarifying apparatus, a casing having an inlet for contaminated liquid, a removable inverted cup-like cover on said casing, a transverse partition in the middle region of said cover and a transverse partition adjacent the lower end of said cover, said partitions dividing the cover into separate filtrate chambers each having an individual outlet, an elongated filter in said casing comprising upper and lower transversely separated filter elements of which the upper extends through the lower partition and discharges into the lower filtrate chamber, and a pipe extending through said elements in communication with the lower element only and also extending through the upper partition whereby the lower element discharges into the upper filtrate chamber.

2. In a liquid clarifying apparatus, a casing having an inlet for contaminated liquid, a removable inverted cup-like cover on said casing, a transverse partition in the middle region of said cover and a transverse partition adjacent the lower end of said cover, said partitions dividing the cover into separate filtrate chambers each having an individual outlet, an elongated filter in said casing comprising upper and lower transversely separated filter elements of which the upper extends through the lower partition and discharges into the lower filtrate chamber, a pipe extending through said elements in communication with the lower element only, the upper partition having an aperture therein to receive the upper end of said pipe, a gasket around said aperture, and spring biased means on the upper part of said pipe to force said gasket against said partition.

3. In a liquid clarifying apparatus, a casing having an inlet for contaminated liquid, a removable inverted cuplike cover on said casing, a transverse partition in the middle region of said cover and a transverse partition adjacent the lower end of said cover, said partitions dividing the cover into separate filtrate chambers each having an individual outlet, an elongated filter in said casing comprising upper and lower transversely separated filter elements of which the upper extends through the lower partition and discharges into the lower filtrate chamber, a pipe extending through said elements in communication with the lower element only, the upper partition having an aperture therein to receive the upper end of said pipe, a gasket around said aperture, a fixed flange on the upper part of said pipe, a floating flange above the fixed flange, and a spring connected at its ends to both said flanges and disposed around said pipe to urge the floating flange into engagement with said gasket when the end of the pipe enters said aperture.

4. In a liquid clarifying apparatus, a casing having an inlet for contaminated liquid, a removable inverted cuplike cover on said casing, a transverse partition in the middle region of said cover and a transverse partition adjacent the lower end of said cover, said partitions dividing the cover into separate filtrate chambers each having an individual outlet, an elongated filter in said casing comprising upper and lower transversely separated filter elements of which the upper extends through the lower partition and discharges into the lower filtrate chamber, a pipe extending through said elements in communication with the lower element only and also extending through the upper partition whereby the lower element discharges into the upper filtrate chamber, a main filtrate pipeline, a conduit leading from each said filtrate chamber to said main pipeline, a valve in each said conduit, and backwash means connected to said main pipeline between said conduits.

References Cited in the file of this patent

UNITED STATES PATENTS

| | | |
|---|---|---|
| 567,249 | Merrill | Sept. 8, 1896 |
| 810,250 | Barth | Jan. 16, 1906 |
| 873,482 | Anderson | Dec. 10, 1907 |
| 1,011,482 | Pemberton | Dec. 12, 1911 |
| 1,288,508 | Chapin | Dec. 24, 1918 |
| 1,734,325 | Cannon | Nov. 5, 1929 |
| 1,771,928 | Jung | July 29, 1930 |
| 1,948,018 | Adams | Feb. 20, 1934 |
| 2,027,681 | Durant et al. | Jan. 14, 1936 |
| 2,218,715 | MacCormack | Oct. 22, 1940 |
| 2,262,863 | Schock | Nov. 18, 1941 |
| 2,279,838 | Oliver | Apr. 14, 1942 |
| 2,406,308 | Vokes et al. | Aug. 20, 1946 |
| 2,418,777 | Le Clair | Apr. 8, 1947 |
| 2,511,292 | Myers | June 13, 1950 |
| 2,598,322 | Vokes | May 27, 1952 |
| 2,655,265 | Little | Oct. 13, 1953 |

FOREIGN PATENTS

| | | |
|---|---|---|
| 404,309 | Great Britain | Jan. 12, 1934 |